United States Patent [19]
Candor et al.

[15] 3,641,680
[45] Feb. 15, 1972

[54] LIQUID-REMOVING APPARATUS AND METHOD
[72] Inventors: Robert R. Candor, 5940 Munger Road, Dayton, Ohio 45459; James T. Candor, 5440 Cynthia Ln., Dayton, Ohio 45429
[22] Filed: June 1, 1970
[21] Appl. No.: 42,335

Related U.S. Application Data

[63] Continuation-in-part of Ser. No. 769,155, Oct. 21, 1968, Pat. No. 3,543,408, which is a continuation-in-part of Ser. No. 748,298, July 29, 1968, Pat. No. 3,491,456, which is a continuation-in-part of Ser. No. 639,639, Jan. 9, 1968, abandoned, which is a continuation-in-part of Ser. No. 639,354, May 18, 1967, Pat. No. 3,405,452, which is a continuation-in-part of Ser. No. 532,266, Mar. 7, 1966, Pat. No. 3,330,136, which is a continuation-in-part of Ser. No. 219,587, Aug. 27, 1962, Pat. No. 3,238,750.

[52] U.S. Cl. ............................................. 34/1, 68/19.1
[51] Int. Cl. .................................................... B01k 5/00
[58] Field of Search ................................................ 34/1

[56] References Cited

UNITED STATES PATENTS 3,470,621  10/1969  Bennett .............................. 34/1
3,543,408  12/1970  Candor et al. ...................... 34/1
3,546,783  12/1970  Candor et al. ...................... 34/1
3,537,185  11/1970  Ingram ............................... 34/1
2,546,004  3/1951   Kinn .................................. 34/1
2,288,269  6/1942   Crandell ............................. 34/1

*Primary Examiner*—Carroll B. Dority, Jr.
*Attorney*—Candor, Candor & Tassone

[57] ABSTRACT

This disclosure relates to a laundry apparatus, papermaking apparatus or the like wherein the moisture in the wet laundry, paper slurry or the like, disposed therein is removed by an electrostatic means that provides a nonuniform field between the moisture in the laundry, paper slurry or the like and an electrode means to tend to cause the moisture to leave the laundry, paper slurry or the like and move toward the electrode means where the higher intensity portion of the nonuniform field is located. Such moisture removal operation can take place while the moisture-bearing material is being subjected to an inaudible scream and/or ultrasonic vibration, etc., to enhance the electrostatic moisture removal operation.

26 Claims, 10 Drawing Figures

INVENTORS
ROBERT R. CANDOR &
JAMES T. CANDOR

THEIR ATTORNEYS

PATENTED FEB 15 1972

INVENTORS
ROBERT R. CANDOR &
JAMES T. CANDOR

Candor, Candor & Tassone

THEIR ATTORNEYS

LIQUID-REMOVING APPARATUS AND METHOD

This application is a continuation-in-part of its copending Pat. application, Ser. No. 769,155, filed Oct. 21, 1968, now U.S. Pat. No. 3,543,408, which, in turn, is a continuation-in-part of its copending Pat. application, Ser. No. 748,298, filed July 29, 1968, now U.S. Pat. No. 3,491,456, which, in turn, is a continuation-in-part of its copending Pat. application, Ser. No. 639,639, filed Jan. 9, 1968, now abandoned, which, in turn, is a continuation-in-part of its copending Pat. application, Ser. No. 639,354, filed May 18, 1967, now U.S. Pat. No. 3,405,452, which, in turn, is a continuation-in-part of its copending Pat. application, Ser. No. 532,266, filed Mar. 7, 1966, now U.S. Pat. No. 3,330,136, which, in turn, is a continuation-in-part of its copending Pat. application, Ser. No. 219,587, filed Aug. 27, 1962, now U.S. Pat. No. 3,238,750.

This invention relates to an improved laundry machine, papermaking apparatus and the like and to an improved method for treating laundry, paper, moisture-bearing material and the like.

In particular, one embodiment of this invention comprises confining means or structure having a rotatable foraminous carriage being adapted to support laundry or the like therein. Means are provided for removing moisture from the laundry by utilizing the attracting forces of a nonuniform electrostatic field.

Thus, the electrostatic means of this invention can be utilized in combination with moisture-bearing material of different types to remove liquid therefrom whether or not the apparatus of this invention is a washing machine, a drying machine, or a combination washing and drying machine. However, the apparatus has uses other than operating on laundry and is not to be limited to such use. For example, the same can be utilized for a drycleaning machine, papermaking machine, etc.

Further, one of the features of this continuation-in-part application is to illustrate, described and claim how certain of the previously described features of the electrostatic means can be utilized in combination with inaudible scream means and/or ultrasonic vibration means to improve moisture removal operations.

Accordingly, it is an object of this invention to provide an improved moisture-removing apparatus having one or more of the novel features set forth above as hereinafter shown or described.

Another object of this invention is to provide an improved method for removing moisture and the like having one or more of the novel features set forth above or hereinafter shown or described.

Other objects, uses and advantages of this invention are apparent upon a reading of this description which proceeds with reference to the accompanying drawings forming a part thereof and wherein.

In order to best understand the features of this invention, the entire disclosure of the aforementioned U.S. Pat. No. 3,491,456 is incorporated herein by reference as background information.

Figure 1:
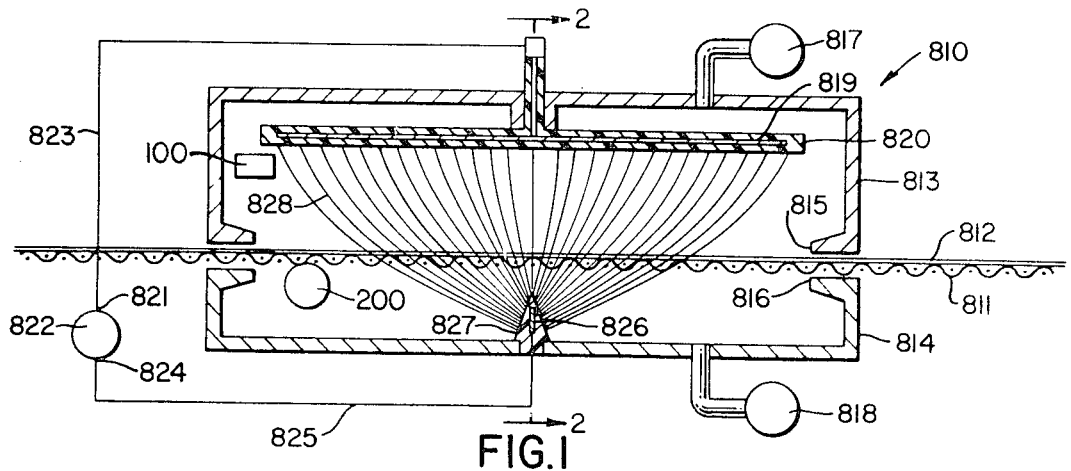
FIG. 1 is a schematic, fragmentary, cross-sectional view illustrating an embodiment of this invention for removing liquid from liquid-bearing material, such as a moist paper sheet.

Therefore, reference is now made to FIG. 1 wherein an embodiment of this invention is generally indicated by the reference numeral 810 and comprises a papermaking apparatus or the like having a continuous foraminous support means 811 moving from left to right in FIG. 1 and carrying moisture-bearing paper means 812 on the upper side thereof that is to have the moisture thereof removed, the support means 811 and paper means 812 moving in unison between two nozzle means 813 and 814 of this invention respectively having open ends 815 and 816 facing toward each other and each being slightly pressurized by dry air being pumped therein by pump means 817 and 818 so as to tend to purge the nozzle means 813 and 814 from humid atmospheric conditions. The nozzle means 813 carries a large plate electrode means 819 covered with suitable insulating material 820 and being interconnected to one side of an electrical potential creating device 822 by lead means 823, the other side 824 of the electrical potential creating device 822 being interconnected by a lead means 825 to a small electrode means 826 covered by suitable insulating material 827 and being carried by the lower nozzle means 814.

By varying the size of the electrode means 819 and 826 relative to each other as well as directing a pointed, serrated or knife edge of the electrode means 826 toward the large plate electrode means 819 as well as by controlling the configuration of the insulating means 820 and 826 and the distance between the electrode means 819 and 826, a strong nonuniform field can be created between the electrode means 826 and 819 wherein the lines of force defining the nonuniform field have the higher intensity thereof adjacent the electrode means 826 as illustrated schematically by the field force lines 828 in FIG. 1.

In this manner, as the moisture-bearing paper material 812 passes between the nozzle means 813 and 814, the moisture therein is attracted by the nonuniform field in such a manner that the moisture tends to move through the foraminous belt means 811 toward the higher intensity portion of electric field 828 and, thus, toward the electrode means 826 for the reasons previously set forth.

While the electrostatic or electrical potential creating device 822 has been described as providing one potential on the electrode means 819 and another potential on the electrode means 826, it is to be understood that the device 822 can create opposite potentials on the electrode means 819 and 826 in an alternating manner whereby alternating current can be utilized rather than direct current as previously described.

Figure 2:
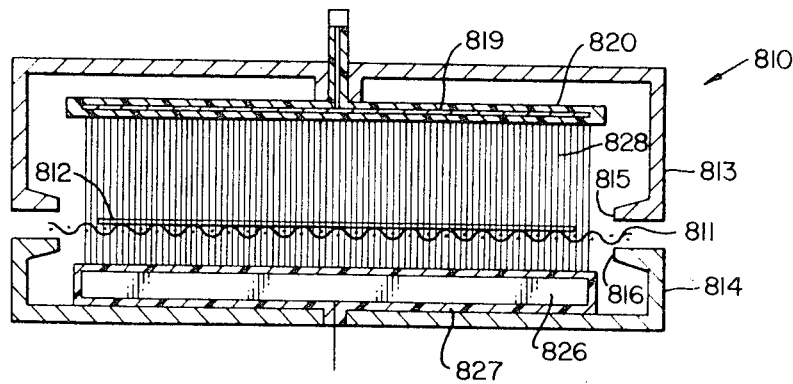
FIG. 2 is a cross-sectional view taken substantially on line 2—2 of FIG. 1.
Figure 3:
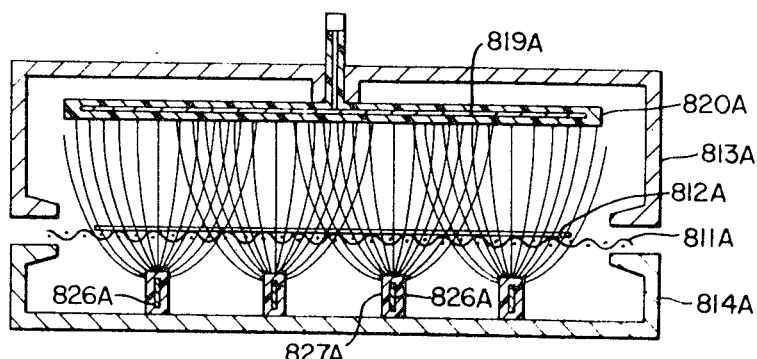
FIG. 3 is a view similar to FIG. 2 and illustrates another embodiment of this invention.

Also, while the electrode means 826 is illustrated in FIG. 2 as being knifelike with the longitudinal axis thereof extending transverse to the direction of movement of the support means 811, it is to be understood that the electrode means 826 could comprise a plurality of individual wires or points 826A as illustrated in FIG. 3 and could be arranged in any suitable pattern relative to the upper electrode means 819A so as to be generally disposed completely under the area bounded by the upper electrode means 819A if desired. Also, the knifelike electrode means 826 of FIGS. 1 and 2 can be disposed with the longitudinal axis thereof extending in the direction of movement of the support means 811 and a plurality of the same can be utilized in a transverse or longitudinal pattern or other as desired, the purpose being to create one or more nonuniform fields between the upper and lower electrode means with the higher intensity portion of the electrostatic or alternating electric field therebetween being adjacent the lower electrode means so as to cause the moisture in the moisture-bearing material to pass through the support means and move toward the higher intensity portion of the electric field adjacent the lower electrode means. Of course, the closer the support means 811 and paper 812 are to the lower electrode means 826, the greater is the force of the nonuniform field thereon for moisture removal purposes.

It may be desirable during the electrostatic moisture-removing operation to tend to break down the moisture in the material to particles as small as possible so that the same will be readily removed from the holding capillary action of the absorbing paper material and the like. It is believed that an inaudible scream means and/or ultrasonic vibrating means acting directly or indirectly on the liquid-bearing material will so break the liquid down into a size more readily removed by the electrostatic forces of this invention. Therefore, item 100 in all of the FIGS. 1 and 4–8 comprises inaudible scream means acting on the moisture-bearing material and item 200 in all of the FIGS. 1 and 4–8 comprises ultrasonic vibration means acting on the supporting means for the moisture-bearing material.

Figure 4:
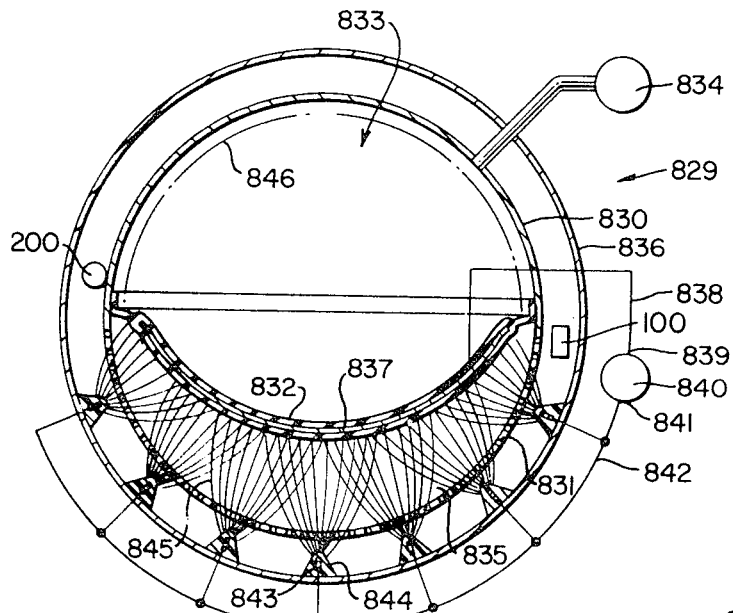
FIG. 4 is a cross-sectional view and illustrates a laundry machine of this invention.

A laundry apparatus of this invention is generally indicated by the reference numeral 829 in FIG. 4 and comprises a substantially spherical inner laundry-supporting structure 830 having one-half thereof perforated as indicated by the perforations 831 while the other half thereof is airtight and cooperates with a flexible membrane 832 to define a chamber 833 therebetween which when pressurized by an air pump 834 or the like will cause the membrane 832 to expand outwardly toward the perforations 831 and trap the moisture-bearing laundry 835 therebetween to impose on the laundry a squeezing action so as to tend to force the moisture therein up through the perforations 831 and into an outer surrounding casing means 836 which can have a suitable drain means at the lower portion thereof. The membrane 832 can be formed of nonconducting material and has a large flexible conductive electrode means 837 embedded therein and being interconnected by a lead means 838 to one side 839 of an electrostatic or electrical potential creating device 840. The other side 841 of the electropotential creating device 840 is interconnected by lead means 842 to a plurality of smaller pointed or knifelike electrode means 843 that are covered with suitable insulating material 844 and are arranged in the bottom half of the casing means 836 so as to cooperate with the large electrode means 837 in creating a plurality of nonuniform fields 845 therebetween whereby the laundry 835 will be disposed in such nonuniform fields, and the moisture in the moisture-bearing laundry 835 will be drawn from the laundry 835 through the perforations 831 and toward the electrode means 843 because the higher intensity portions of the electric fields 845 are adjacent the electrode means 843.

While the particular details of a laundry apparatus similar to the apparatus 829 of FIG. 4 are disclosed and claimed in applicant's copending Pat. application, Ser. No. 701,602, filed Jan. 30, 1968, and now U.S. Pat. No. 3,491,387, the particular details thereof need not be described except as follows to illustrate the operation of the apparatus 829.

Normally, the air pump 834 is caused to operate in a manner to create a low pressure in the chamber 833 whereby the flexible membrane 832 is disposed against the inside surface of the spherical casing 830 in the dotted line position illustrated by the reference numeral 846 so that the interior of the supporting means 830 can receive laundry to be washed therein in a conventional manner by the rotation of the spherical casing 830 about a horizontal axis in any suitable manner.

However, when it is desired to remove the moisture from the wet laundry 835, the rotation of the spherical member 830 is stopped in the position illustrated in FIG. 21 so that the perforations 831 are facing downwardly whereby the pump 834 is activated to create a high pressure in the chamber 833 so that the flexible membrane 832 moves downwardly from its dotted-line position 846 toward the laundry to compact and compress the same between the membrane 832 and the perforations 831 to squeeze moisture therefrom and hold the electrode means 837 closely adjacent the lower electrode means 843. With the membrane 832 in its down position as illustrated in FIG. 4, the electrode means 837 and 843 cooperate together to create the nonuniform fields 845 to continuously draw moisture from the moisture-bearing material 835 until it is desired to redistribute the laundry 835 therein or remove the laundry 835 therefrom as desired, such electrostatic action taking place with or without the use of the inaudible scream means 100 and/or ultrasonic vibrator means 200.

In this manner, the laundry apparatus 829 can remain in the position illustrated in FIG. 4 during the entire moisture-removing operation whereby the subsequent return of the membrane 832 to the dotted-line position 846 will permit the now dried laundry 835 to be removed from the apparatus 829.

While the laundry machine of this invention has been previously described as utilizing the electrical potential differential or electric field feature of this invention in connection with laundry-receiving supporting structure that normally rotates about a horizontal axis, it is to be understood that the various features of this invention can be utilized with laundry machines wherein the laundry-supporting member is rotated generally about a vertically disposed axis.

Figure 5:
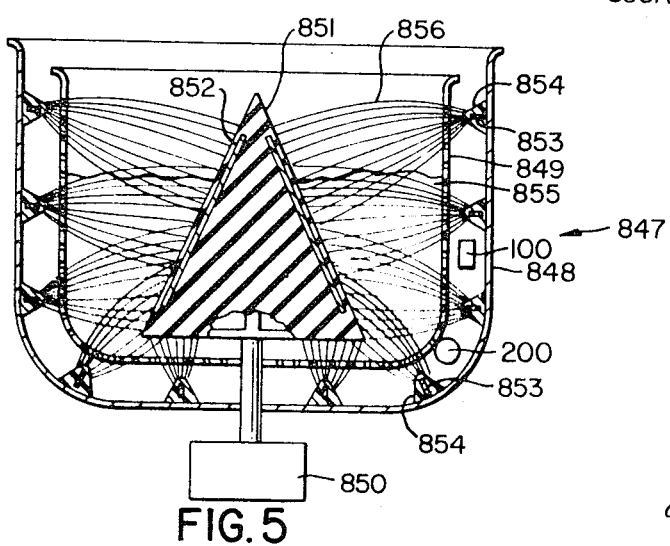
FIG. 5 is a view similar to FIG. 4 and illustrates another laundry machine of this invention, the laundry machine being of the "vertical" type.

For example, reference is now made to FIG. 5 wherein another laundry apparatus of this invention is generally indicated by the reference numeral 847 and comprises an outer stationary tub 848 having a rotatable inner perforated tub 849 disposed therein and adapted to be rotated about a vertical axis by suitable transmission means 850 in a manner well known in the art. In addition, a vertically disposed agitator 851 is disposed in the perforated tub 849 to agitate the laundry and wash and rinse water in a manner well known in the art, the agitator 851 also being controlled by the transmission means 850 in a manner conventional in the art.

However, the agitator 851 of this invention includes an annular platelike electrode means 852 embedded therein adjacent the outer periphery thereof to cooperate with a plurality of outer knifelike or pointed electrode means 853 carried by the outer tub 848 and being insulated by suitable insulating means 854.

The operation of the laundry machine 847 will now be described.

After the laundry 855 has been washed in the apparatus 847 in a conventional manner for a vertically disposed laundry machine and the water has been drained from the tub 848 in a conventional manner, the transmission means 850 can spin the inner tub 849 about a vertical axis at a high speed to centrifuge substantially a large amount of moisture from the moisture-bearing laundry 855 whereby the laundry 855 is compacted tightly against the outer tub 849 in substantially a "doughnut" configuration and will remain in such configuration until removed by the operator or the like. At this time, the tub 849 can be held stationary and one electrical potential can be created on the outer electrode means 853 and an opposite potential on the large platelike electrode means 852 in any suitable manner, such as by the device 840 of FIG. 4 whereby a plurality of electrostatic fields of nonuniform configuration and generally indicated by the reference numeral 856 in FIG. 5 will be created between the electrode means 852 and 853 so as to tend to cause the moisture in the moisture-bearing material 855 to move outwardly toward the higher intensity portions of the fields 856 and pass through the perforated inner tub 849 toward the outer electrode means 853 whereby the laundry 855 can be dried in the apparatus 847 in the manner previously described. If desired, the tub 849 can be rotated during the moisture-removing operation to bring different portions of the laundry 855 into different portions of the fields 856. Also, the means 100 and/or 200 can be utilized.

Of course, it is to be understood that it may not be necessary to centrifuge the laundry 855 by spinning the tub 849 at a high speed because it is believed that the electrostatic principal of this invention can remove such moisture without a prior centrifuging operation.

Figure 6:
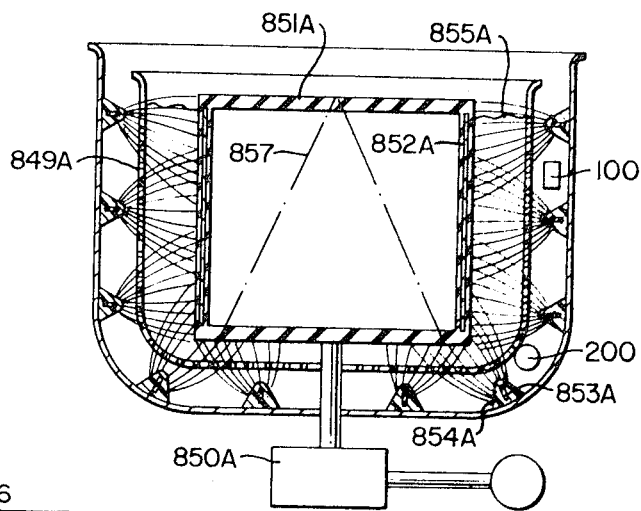
FIG. 6 is a view similar to FIG. 4 and illustrates another laundry machine of this invention, the laundry machine also being of the "vertical" type.

If it is desired to move the inner electrode means 852 of the vertical apparatus 847 closer to the outer electrode means 853 to increase the intensity of the nonuniform fields 856, the agitator 851 can be formed in the manner illustrated in FIG. 6 wherein the agitator 851A is expandable from the conventional substantially conical condition illustrated by broken line 857 in FIG. 6 to a substantially cylindrical configuration illustrated in full lines wherein the expandable conductive platelike electrode means 852A is disposed closely adjacent the outer electrode means 853A, the expanding of the agitator 851A outwardly also compresses the laundry 855A against the inner tub 849A to squeeze water therefrom in substantially the same manner as the membrane 832 of FIG. 4 previously described.

Therefore, it can be seen that the laundry apparatus set forth in applicant's FIGS. 4-6 are each adapted to remove moisture from the laundry by the electrostatic principles of this invention wherein the nonuniform fields created between the inner and outer electrode means are so constructed and arranged that the higher intensity portion of the electrostatic fields are adjacent the collecting electrode means so as to cause the moisture in the moisture-bearing material to move toward the same and leave the moisture-bearing material without requiring a heating or conventional evaporative process in drying the laundry, even though a heating and evaporative process can be utilized with the electrode means of this invention as previously stated.

While the various apparatus of this invention have been previously described in utilizing the electrostatic feature of this invention for removing the moisture from the moisture-bearing material through the supporting means carrying the moisture-bearing material toward an electrode means disposed spaced from the supporting means, it is to be understood that the electrostatic principles of this invention can be utilized to remove the moisture from the moisture-bearing material without causing the moisture to actually leave and pass through the supporting means.

Figure 7:
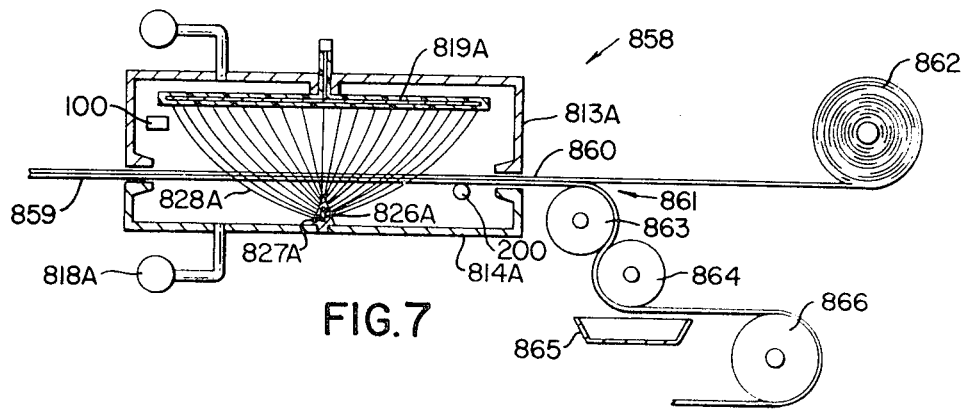
FIG. 7 is a view similar to FIG. 1 and illustrates another embodiment of this invention.

For example, reference is now made to FIG. 7 wherein another papermaking apparatus of this invention is generally indicated by the reference numeral 858 and includes upper and lower nozzle means 813A and 814A formed in the same manner as the nozzle means 813 and 814 of FIG. 18 previously described wherein the electrode means 826A and 819A create a nonuniform field 828A therebetween.

The continuously moving support means 859 passes between the nozzle means 813A and 814A and carries the moisture-bearing paper material 860 therewith toward the right, the supporting means 859 comprising moisture-absorbing material, such as felt or the like, on the upper side thereof and a moisture-impervious lower surface formed from plastic or the like for a purpose now to be described.

As the moisture-bearing material 860 and support means 859 pass through the electrostatic field 828A, the higher intensity portion of the electrostatic field 828A causes the moisture in the moisture-bearing material 860 to be driven into the moisture-bearing upper side of the support means 859 while the moisture-impervious lower side thereof prevents the moisture from entering into the lower nozzle means 814A. In this manner, the moisture is removed from the moisture-bearing material 860 but is received in and retained in the supporting means 859 which is separated from the dried paper in the region of the reference numeral 861 whereby the dried paper 860 is drawn onto the supply roll means 862 and the support means 859 passes between a pair of squeezing rollers 863 and 864 to remove the collected moisture therefrom and be carried away by a trough means 856 or other suitable means before the support means 859 is directed back to the left by a roller means 866 to pickup more wet paper slurry 860 to be passed between the nozzle means 813A and 814A.

Of course, the support means 859 need not have a moisture-impervious material on the lower side thereof as the electrostatic field 828A could be so constructed and arranged that the same will merely cause the moisture in the moisture-bearing material 860 to enter the moisture-absorbing material 659 and be held thereby before passing out of the supporting means 859 toward the lower electrode means 826A, as the particular portion of the absorbing support means 859 has passed out of the field 828A.

Also, the moisture-absorbing material 859 could be so constructed and arranged that the same does permit the moisture collected therein to pass toward the electrode means 826A in the manner previously described to be removed from the nozzle means 814A in the manner previously described.

However, it is to be understood that if the moisture in the moisture-bearing material is drawn into the supporting means and prevented from leaving the supporting means so as to contaminate the lower electrode means, the lower electrode means 826A of FIG. 7 can be surrounded by a dry atmosphere by the pressure means 818A and never have the effective potential thereof changed by the moisture in the moisture-bearing material 860.

Figure 8:
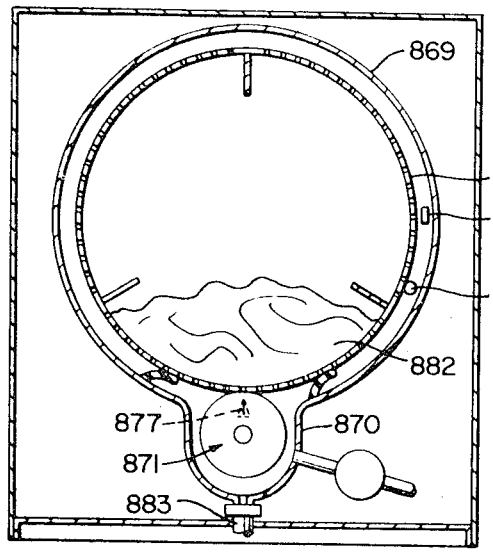
FIG. 8 is a view similar to FIG. 1 and illustrates another embodiment of this invention.
Figure 10:
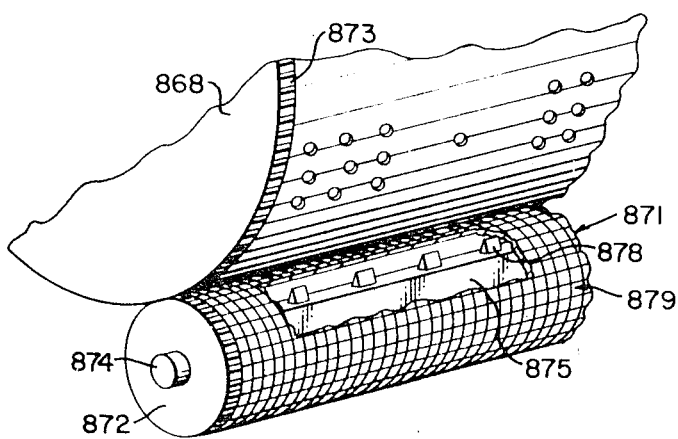
FIG. 10 is a perspective view of the parts of FIG. 9.

Similarly, another laundry apparatus of this invention is generally indicated by the reference numeral 867 in FIG. 8 and comprises a rotatable foraminous drum 868 mounted in a water-retaining drum or casing 869 having a lower cavity 870 receiving a rotatable and cylindrical moisture-collecting means 871 of this invention adapted to be rotated in unison with the drum 868 through either cooperating gear means or by friction as desired. However, as illustrated in FIG. 10, the collecting drum means 871 has pinion gear means 872 on the outer ends thereof disposed in meshing relation with pinion gear means 873 on the outer ends of the rotatable drum 868 so as the drum means 868 is driven in one direction in a conventional manner, the rotation of the drum means 868 causes rotation of the collecting means 871 about stationary shaft means 874 carried by the outer tub 869 and being secured to a support means 875 inside the collector drum 871. The support means 875 therefore remains stationary as the outer portion 876 of the collector means 871 is rotated, the support means 875 carrying a plurality of knifelike or pointed electrode means 877 suitably insulated by insulating material 878 or noninsulated as desired as no moisture can reach the electrode means 877.

Figure 9:
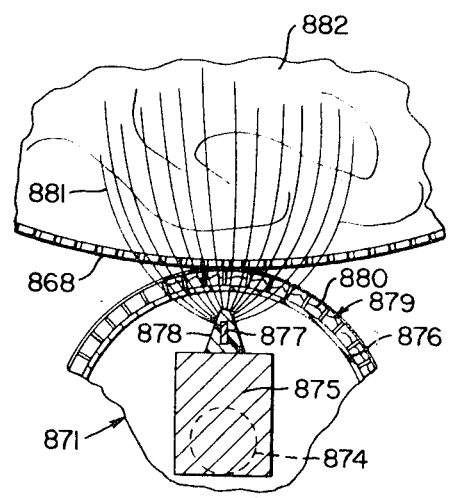
FIG. 9 is an enlarged, fragmentary, cross-sectional view of the apparatus of FIG. 8.

In particular, the outer portion 876 of the collector means 871 can be formed of insulating material and can have a plurality of pockets 879 formed on the outer surface thereof adapted to receive moisture therein as illustrated by the reference numeral 880 in FIg. 9.

By creating one electrical potential on the electrode means 877 and an opposite potential on the inner drum 868 in the manner previously described or on the other internal electrode means mounted with the rotatable drum 868, nonuniform fields 881 are provided as illustrated in FIG. 9 which tend to cause the moisture in the moisture-bearing laundry 882 to pass through the perforated drum 868 into the pockets 879 as illustrated in FIG. 9 and be carried by the pockets 880 from above the electrode means 877 down below the same and out of the force of attraction of the fields of the electrode means 877 whereby the moisture 880 is dumped from the pockets 879 into the chamber 870 to be drained therefrom by conventional draining means 863.

Therefore, it can been seen that the laundry apparatus 867 of FIGS. 8-10 causes the moisture in the moisture-bearing material to be drawn therefrom and be collected in the collecting means 871 in such a manner that the collecting means 871 carries the collected moisture away from the electric field means created by the electrode means 877 into a position over the drain 883 so that the moisture 880 can drop out of the pockets 879 to be carried away at the drain 883.

If desired, the supporting means in the various embodiments of this invention can be formed of conductive material or nonconductive material and if conductive, can be grounded, charged or insulated from ground depending on the desired results of the field force characteristics produced thereby. Also, the moisture in the moisture-bearing material can be conductive or nonconductive.

Thus, it can be seen that the various principles of this invention can be utilized to dry moisture-bearing material, whether the same be laundry, paper, pellets, etc., by causing the moisture thereof to pass through the supporting means toward an electrode means or pass into a supporting means to be carried away by the supporting means as desired.

While the forms of the invention now preferred have been disclosed as required by the statutes, other forms may be used, all coming within the scope of the claims which follow.

What is claimed is:

1. In an apparatus for removing retained moisture from moisure-bearing material of the moisture-absorbing type, supporting means for supporting said moisture-bearing material on one side thereof, and a charged electrode means disposed adjacent but out of electrical contact with said material while creating a substantially constant electrostatic field action that will cause at least some of the retained moisture of said moisture-bearing material to leave said material solely by the substantially constant electrostatic field action created by said charged electrode means, and means acting on said material to tend to cause the moisture particles therein to be reduced in size to enhance the electrostatic field action in removing the same from said material.

2. In an apparatus as set forth in claim 1, said support means being electrically conductive.

3. In an apparatus as set forth in claim 1, said support means being electrically nonconductive.

4. In an apparatus as set forth in claim 1, the last-named means comprising means for vibrating said material.

5. In an apparatus as set forth in claim 1, the last-named means comprising an inaudible scream means.

6. In a method for removing retained moisture from moisture-bearing material of the moisture-absorbing type, the steps of supporting said material on one side of a supporting means, disposing a charged electrode means adjacent but out of electrical contact with said material while creating a substantially constant electrostatic field action that will cause at least some of the retained moisture of said material to leave said material solely by the substantially constant electrostatic field action created by said charged electrode means, and tending to cause the moisture particles in said material to be reduced in size to enhance the electrostatic field action in removing the same from said material.

7. In a method as set forth in claim 6, the last step comprising the step of vibrating said material.

8. In a method as set forth in claim 6, the last step comprising the step of subjecting said material to an inaudible scream.

9. In a method as set forth in claim 6, said support means being electrically conductive.

10. In a method as set forth in claim 6, said support means being electrically nonconductive.

11. In an apparatus for removing liquid from liquid-bearing material, the improvement comprising support means for supporting said liquid-bearing material, electrode means disposed adjacent said liquid-bearing material for creating a nonuniform electric field across at least part of said supported liquid-bearing material to cause at least part of said liquid of said liquid-bearing material that is disposed in said field to leave said liquid-bearing material, and means for subjecting said liquid-bearing material to an action that tends to reduce the particle size of said liquid to enhance said electrostatic field action in its liquid-removing operation.

12. In an apparatus as set forth in claim 11, the further improvement comprising means for causing relative movement between said liquid-bearing material and said electrode means to cause different portions of said liquid-bearing material to be subjected to said action of said nonuniform field.

13. In an apparatus as set forth in claim 11, the further improvement comprising another electrode means cooperating with said first-named electrode means to create said nonuniform field therebetween.

14. In an apparatus as set forth in claim 13, the further improvement comprising means for creating one potential on said first-named electrode means and an opposite potential on said other electrode means to produce said nonuniform field.

15. In an apparatus as set forth in claim 14, said means for creating said potentials on said electrode means comprising means for creating said potentials in an alternating manner.

16. In an apparatus as set forth in claim 13, the further improvement comprising means for causing relative movement between said liquid-bearing material and said electrode means to cause different portions of said liquid-bearing material to be disposed in said nonuniform field.

17. In an apparatus as set forth in claim 11, said liquid being nonconductive.

18. In an apparatus for removing liquid from liquid-bearing material, the improvement comprising support means for supporting said liquid-bearing material, electrode means disposed adjacent said liquid-bearing material for creating a nonuniform electric field across at least part of said supported liquid-bearing material to cause at least part of said liquid of said liquid-bearing material that is disposed in said field to leave said liquid-bearing material, and means for subjecting said liquid-bearing material to vibrations to enhance said electrostatic field action in its liquid-removing operation.

19. In an apparatus for removing liquid from liquid-bearing material, the improvement comprising support means for supporting said liquid-bearing material, and electrode means disposed adjacent said liquid-bearing material for creating a nonuniform electric field across at least part of said supported liquid-bearing material to cause at least part of said liquid of said liquid-bearing material that is disposed in said field to leave said liquid-bearing material, and means for subjecting said liquid-bearing material to an inaudible scream to enhance said electrostatic field action in its liquid-removing operation.

20. In an apparatus as set forth in claim 11, said liquid being conductive.

21. In an apparatus for removing liquid from liquid-bearing material, supporting means for supporting said liquid-bearing material, electrode means disposed adjacent said material, means for creating a substantially constant electrostatic field action with said electrode means that will cause at least some of the liquid of said liquid-bearing material to leave said material solely by the substantially constant electrostatic field action created with said electrode means, and means acting on said material to tend to cause the liquid particles therein to be reduced in size to enhance the electrostatic field action in removing the same from said material.

22. In an apparatus for removing liquid from liquid-bearing material, supporting means for supporting said liquid-bearing material, electrode means disposed adjacent said material, means for creating a substantially constant electrostatic field action with said electrode means that will cause at least some of the liquid of said liquid-bearing material to leave said material solely by the substantially constant electrostatic field action created with said electrode means, and means acting on said material to enhance the electrostatic field action in removing said liquid from said material, the last-named means comprising means for vibrating said material.

23. In an apparatus for removing liquid from liquid-bearing material, supporting means for supporting said liquid-bearing material, electrode means disposed adjacent said material, means for creating a substantially constant electrostatic field action with said electrode means that will cause at least some of the liquid of said liquid-bearing material to leave said material solely by the substantially constant electrostatic field action created with said electrode means, and means acting on said material to enhance the electrostatic field action in removing said liquid from said material, the last-named means comprising an inaudible scream means.

24. In a method for removing liquid from liquid-bearing material, the steps of supporting said material, disposing electrode means adjacent said material, creating a substantially constant electrostatic field action with said electrode means that will cause at least some of the liquid of said material to leave said material solely by the substantially constant electrostatic field action created with said electrode means, and tending to cause the liquid particles in said material to be reduced in size to enhance the electrostatic field action in removing the same from said material.

25. In a method for removing liquid from liquid-bearing material, the steps of supporting said material, disposing electrode means adjacent said material, creating a substantially constant electrostatic field action with said electrode means that will cause at least some of the liquid of said material to leave said material solely by the substantially constant electrostatic field action created with said electrode means, and acting on said material to enhance the electrostatic field action in removing said liquid from said material, the last step comprising the step of vibrating said material.

26. In a method for removing liquid from liquid-bearing material, the steps of supporting said material, disposing electrode means adjacent said material, creating a substantially constant electrostatic field action with said electrode means that will cause at least some of the liquid of said material to leave said material solely by the substantially constant electrostatic field action created with said electrode means, and acting on said material to enhance the electrostatic field action in removing said liquid from said material, the last step comprising the step of subjecting said material to an inaudible scream.

* * * * *

Dedication 3,641,680.—*Robert R. Candor*, Miami Township and *James T. Candor*, Washington Township, Ohio. LIQUID-REMOVING APPARATUS AND METHOD. Patent dated Feb. 15, 1972. Dedication filed Oct. 17, 1980, by the inventor.

Hereby dedicates to the Public the entire term of said patent.

[*Official Gazette January 6, 1981.*]
1980, by the inventor.